United States Patent
Lee et al.

(10) Patent No.: US 9,434,833 B2
(45) Date of Patent: Sep. 6, 2016

(54) BULK PVC COMPOSITION, BULK PVC POLYMERIZATION METHOD AND APPARATUS

(71) Applicant: LG CHEM, LTD., Seoul (KR)

(72) Inventors: Dong Kwon Lee, Daejeon (KR); Kwang Hyon Kim, Daejeon (KR); Bo Hee Park, Daejeon (KR); Se Woong Lee, Daejeon (KR); Jin Hyuck Ju, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/774,052

(22) PCT Filed: Sep. 30, 2014

(86) PCT No.: PCT/KR2014/009190
§ 371 (c)(1),
(2) Date: Sep. 9, 2015

(87) PCT Pub. No.: WO2015/047021
PCT Pub. Date: Apr. 2, 2015

(65) Prior Publication Data
US 2016/0017116 A1    Jan. 21, 2016

(30) Foreign Application Priority Data

Sep. 30, 2013 (KR) .................. 10-2013-0116241
Sep. 30, 2014 (KR) .................. 10-2014-0130728

(51) Int. Cl.
| | | |
|---|---|---|
| *C08K 5/05* | (2006.01) | |
| *B01J 19/00* | (2006.01) | |
| *C08K 5/053* | (2006.01) | |
| *C08F 114/06* | (2006.01) | |
| *C08F 2/01* | (2006.01) | |
| *C08F 2/02* | (2006.01) | |
| *C08F 14/06* | (2006.01) | |
| *C08F 2/44* | (2006.01) | |
| *B01J 19/24* | (2006.01) | |

(52) U.S. Cl.
CPC ............... *C08K 5/053* (2013.01); *B01J 19/24* (2013.01); *C08F 2/01* (2013.01); *C08F 2/02* (2013.01); *C08F 2/44* (2013.01); *C08F 14/06* (2013.01); *C08F 114/06* (2013.01); *B01J 2219/24* (2013.01); *C08K 5/05* (2013.01)

(58) Field of Classification Search
CPC .......... C08F 114/06; C08F 2/01; C08F 2/02; C08F 2/44; C08F 14/06; B01J 19/24; B01J 2219/24; C08K 5/053; C08K 5/05; C08L 27/06
USPC .......................................... 524/765; 422/131
See application file for complete search history.

(56) References Cited

U.S. PATENT DOCUMENTS

| | | | | |
|---|---|---|---|---|
| 4,009,048 A | * | 2/1977 | Jensen ..................... | B08B 3/08 |
| | | | | 134/12 |
| 4,963,634 A | | 10/1990 | DiRienzo | |
| 2009/0170984 A1 | * | 7/2009 | Blum ................... | C08K 5/0041 |
| | | | | 524/99 |

FOREIGN PATENT DOCUMENTS

| | | |
|---|---|---|
| JP | 2006022157 A | 1/2006 |
| JP | 2006321946 A | 11/2006 |
| KR | 1020090039117 A | 4/2009 |
| KR | 1020100023340 A | 3/2010 |
| KR | 1020120007227 A | 1/2012 |
| KR | 1020120035261 A | 4/2012 |

* cited by examiner

*Primary Examiner* — William Cheung
(74) *Attorney, Agent, or Firm* — Dentons US LLP

(57) ABSTRACT

Disclosed are a bulk PVC composition and a bulk PVC polymerization method using the same. According to the present invention, a bulk PVC composition that may effectively prevent generation of fine particles and scale (adhering to a reactor wall) during bulk polymerization and may be prepared without a post-treatment process of an antistatic agent added to easily isolate fine particles after bulk PVC polymerization, and a method and apparatus for polymerizing the same may be provided.

10 Claims, No Drawings

BULK PVC COMPOSITION, BULK PVC POLYMERIZATION METHOD AND APPARATUS

This application is a National Stage Application of International Application No. PCT/KR2014/009190, filed Sep. 30, 2014, and claims the benefit of Korean Application No. 10-2013-0116241, filed Sep. 30, 2013, and Korean Application No. 10-2014-0130728, filed Sep. 30, 2014, all of which are hereby incorporated by reference in their entirety for all purposes as if fully set forth herein.

TECHNICAL FIELD

The present invention relates to a bulk PVC composition, and a method and apparatus for polymerizing the same. More particularly, a bulk PVC composition that may effectively prevent generation of fine particles and scale (adhering to a reactor wall) during bulk polymerization by adding a specific bulk PVC particle coating agent at a specific time point and may be prepared without a post-treatment process of an antistatic agent added to easily isolate fine particles after bulk PVC polymerization, and a method and apparatus for polymerizing the same are provided.

BACKGROUND ART

Vinyl chloride resins (hereinafter referred to as PVC) are easily processed thermoplastic resins since they are easily softened at 150 to 170° C. Vinyl chloride resins have superior water resistance, chemical resistance and petroleum resistance, and are hard, whereby they are used in lining plates, pumps, tanks, plating water baths, treatment water baths, and the like. Since vinyl chloride resins are softened due to addition of a large amount of plasticizer (40 to 80%), they are used in sheets, sides, films, tiles and the like.

PVC manufacturing methods using bulk polymerization do not use a heating medium such as water unlike suspension polymerization and emulsion polymerization, and polymerization thereof is performed using only a vinyl chloride monomer initiator and, as needed, a reaction additive. After polymerization, PVC may be obtained without a drying process.

In addition, in bulk polymerization, an apparatus for bulk polymerization is simple, reaction rate is fast, yield is high, high-purity polymers may be obtained, and polymers may be intactly handled. However, there are drawbacks such as difficult temperature control to strong heating of polymerization systems, extended molecular weight distribution of polymers and difficult precipitation. Therefore, since a heating medium for heat removal is not present in bulk polymerization, it is very important to maintain heat removal stability.

A vinyl chloride monomer and initiator are only supplied into a reactor for bulk polymerization before polymerization, and water as a heating medium, as in emulsion polymerization or suspension polymerization, is not supplied. Accordingly, in preparing PVC using bulk polymerization, while the amounts of liquid-phase vinyl chloride monomers in a reaction system decrease and the amount of solid-phase PVC increases, as polymerization proceeds, solid-phase PVC is distributed in liquid-phase vinyl chloride monomers. In particular, since the specific gravity of PVC (1.35 to 1.45) is greater than that of the vinyl chloride monomer (approximately 0.97), PVC is mainly present in an upper portion of a reactor.

As polymerization progresses, the amounts of vinyl chloride monomers decrease and the amount of PVC increase. Accordingly, all PVC generated in an initial reaction step may maintain a state of being surrounded with vinyl chloride monomers, but, accordingly polymerization progress, the amount of PVC increases and the amounts of vinyl chloride monomers decrease, whereby it become impossible to maintain the state that solid-phase PVC is surrounded with liquids, namely, liquid-phase vinyl chloride monomer. Accordingly, liquidity of PVC decreases and an average distance between PVC particles is shortened, whereby fine particles may be generated due to excessive agglomeration among particles or friction among particles.

In addition, vaporization of liquid-phase vinyl chloride monomers is induced by properly removing gas-phase vinyl chloride monomers in a reaction system, when liquid-phase vinyl chloride monomers are sufficiently present, whereby it is possible to stably maintain proper reaction temperature (namely, polymerization temperature) by removing reaction heat (namely, polymerization heat). However, it is difficult to remove reaction heat when liquid-phase vinyl chloride monomers are deficient, whereby possibility of a local heating phenomenon increases. Accordingly, an agglomeration phenomenon due to fusion among PVC particles may be induced.

The problems are directly related to problems such as abnormal products (fine particle products, mass products due to agglomeration and the like), PVC production having non-uniform particles and the like.

Until today, technical development has focused on collecting fine particles by additionally installing a particle separator after reaction, in order to reduce the amounts of fine particles. Here, when a screening method generally used to remove fine particles is used, a screener is easily blocked due to a static feature of bulk polymerization particles. To complement this, U.S. Pat. No. 4,963,634 introduced a collection method using air movement. However, since this technology is costly and it is not suitable for using collected fine particles, the method is not a fundamental solution. In addition, although an antistatic agent is added to easily isolate fine particles by preventing static between PVC particles, generation of fine particles and scale may not be prevented by the antistatic agent added after polymerization.

There is a need for a method to fundamentally prevent change of normal particles into fine particles due to strong external force applied to particles during conventional bulk PVC polymerization.

DISCLOSURE

Technical Problem

Therefore, the present invention has been made in view of the above problems, and it is one object of the present invention to provide a bulk PVC composition that may effectively prevent generation of fine particles and scale (adhering to a reactor wall) during bulk polymerization, and a bulk PVC polymerization method and apparatus using the same.

Technical Solution

In accordance with one aspect of the present invention, provided is a bulk PVC composition including a vinyl chloride monomer, an initiator and a bulk PVC particle coating agent In accordance with another aspect of the present invention, provided is a bulk PVC polymerization method, the bulk PVC polymerization being performed such that a distribution ratio of fine particles having sizes of 70 μm or less is less than 2.5%

In accordance with yet another aspect of the present invention, provided is an apparatus for PVC bulk polymerization including a reactor for bulk polymerization, the apparatus including a supply pipe inputting a PVC particle coating agent into a post-polymerization reactor after pre-polymerization.

Advantageous Effects

As apparent from the foregoing, the present invention advantageously provides a bulk PVC composition that may effectively prevent generation of fine particles and scale (adhering to a reactor wall) during bulk polymerization and may be prepared without a post-treatment process of an antistatic agent added to easily isolate fine particles after the bulk PVC polymerization, and a method and apparatus for polymerizing the same may be provided

BEST MODE

Hereinafter, the present invention will be described in more detail.

In particular, a bulk PVC composition according to the present invention includes a vinyl chloride monomer, an initiator and a bulk PVC particle coating agent.

Unless otherwise specified, the expression "bulk PVC particle coating agent" means a coating agent that is input during bulk polymerization when some PVC particles are generated in order to coat bulk PVC particles.

The PVC particle coating agent is not specified so long as friction between solid-phase PVC particles may be prevented. For example, the PVC particle coating agent may be a hydrocarbon alcohol having two to four hydroxyl groups.

The hydrocarbon alcohol having two to four hydroxyl groups may be one or more selected from, as specific examples, ethylene glycol, diethylene glycol, propylene glycol, hexamethylene glycol, propanetriol, trimethylolpropane and pentaerythritol.

In another embodiment, the hydrocarbon alcohol having two to four hydroxyl groups may be propanetriol.

The bulk PVC particle coating agent may be included during bulk polymerization when some solid-phase PVC particles are generated. In an embodiment, the bulk PVC particle coating agent may be included when a bulk polymerization conversion ratio is 30 to 70%, or 50 to 70%.

In an embodiment, the bulk PVC particle coating agent may be included in an amount of 50 to 300 ppm with respect to 100 parts by weight of the vinyl chloride monomer. When the amount is less than 50 ppm, it is difficult to obtain effects of the coating agent. When the amount is greater than 300 ppm, bulk PVC particles may adhere to one another.

In a specific embodiment, the bulk PVC particle coating agent may be included in an amount of 50 to 150 ppm with respect to 100 parts by weight of the vinyl chloride monomer.

Here, the vinyl chloride monomer is only a vinyl chloride monomer or a mixture of a monomer copolymerizable with the vinyl chloride monomer. Preferably, the monomer copolymerizable with the vinyl chloride monomer is any one of vinyl esters, aromatic vinyl compounds, acylic acids, monoolefins and vinylidene halides, or a mixture of two or more thereof.

In other words, the monomer used in the present invention is only a vinyl chloride monomer or a mixture of a monomer copolymerizable with the vinyl chloride monomer. In general, the monomer copolymerizable with the vinyl chloride monomer is vinyl esters, aromatic vinyl compounds, acylic acids, monoolefins, vinylidene halides, or the like. The monomer may be used alone or as a mixture of two or more thereof.

The initiator may be any one of 3-hydroxy-1,1-dimethylbutylperoxyneodecanoate, cumyl peroxyneodecanoate, 1,1,3,3-tetramethylbutyl peroxyneodecanoate, cumyl peroxyneoheptanoate, t-amylperoxy neodecanoate, t-butylperoxy neodecanoate and t-butylperoxy neoheptanoate, or a mixture of two or more thereof.

Here, although a use amount of the polymerization initiator depends upon polymerization temperature, reaction time, polymerization initiator types and the like, the polymerization initiator may be included, for example, in an amount of 0.01 to 0.1 parts by weight or 0.02 to 0.05 parts by weight with respect to 100 parts by weight of the vinyl chloride monomer.

When bulk PVC polymerization using the bulk PVC composition is performed, the polymerization is performed such that a distribution ratio of fine particles is less than 2.5%. As an embodiment, the polymerization may be performed as follows.

The vinyl chloride monomer is bulk-polymerized in the presence of an initiator (hereinafter referred to as pre-polymerizing).

Post-polymerization is performed by inputting a particle coating agent into an inner wall of a post-polymerization reactor and an agitator after the bulk polymerization, and by inputting a seed polymer and a vinyl chloride monomer transferred from a pre-polymerization reactor thereinto.

The expression "fine particle distribution ratio" means a distribution ratio of fine particles having an average diameter of 70 μm or less, and, unless otherwise specified, means a distribution ratio measured with a particle diameter analyzer (HELOS/BR apparatus manufactured by SYMPATEC). In a specific embodiment, a distribution ratio of fine particles having sizes of 70 μm or less may be less than 2.0%.

In another embodiment, a distribution ratio of fine particles having 20 μm or less fine particles may be less than 1.0%.

First, polymerization conditions are not specified so long as the polymerization conditions are general PVC bulk polymerization conditions. At 50 to 70° C., pre-polymerization may be carried out for approximately 10 to 20 minutes, and post-polymerization may be carried out for approximately 150 to 200 minutes.

Pre-polymerization serves to generate a seed polymer. In an embodiment, pre-polymerization may be carried out until a polymerization conversion ratio is approximately 10 to 15% or a reaction pressure is 8 kg/cm$^2$.

Subsequently, after transferring to a post-polymerization reactor, polymerization may be further carried out.

In addition, types and shapes of reactors, agitators, baffles and the like used in the present invention are not specifically limited, and an apparatus used in conventional PVC bulk polymerization may be used.

The coating is carried out to prevent friction among the bulk PVC particles, and may completely wrap the bulk PVC particles. Also when the coating is partially or very partially performed, effects may be superior.

By including a coating process like this, generation amounts of fine particles due to friction among bulk PVC particles may be reduced. In addition, blocked heat conduction and difficult reactor heat removal due to the fine particles adhering to an inner wall of a polymerization reactor and a wall of an agitator (scale) may be resolved, and uniform PVC particle generation may be secured.

Due to the coating, repetitively coating a scale inhibitor on an inner portion of a reactor may be decreased. In addition, application of an antistatic agent that is input after bulk PVC polymerization to easily isolate fine particles by preventing static among bulk PVC particles may be omitted.

In addition, post-polymerization may be carried out until a polymerization conversion ratio reaches approximately 60 to 70%, or a reaction pressure reaches to 3.5 kg/cm$^2$.

According to the method of the present invention, bulk PVC having normal particle diameter distribution of 20 to 300 μm and an average particle diameter of approximately 150 μm may be provided.

In addition, the present invention provides an apparatus for PVC bulk polymerization including a reactor for bulk polymerization. The apparatus includes a supply pipe for inputting a bulk PVC particle coating agent into the reactor between pre-polymerization and post-polymerization.

The reactor may further include at least one raw-material supply pipe and condenser. There may be at least one raw-material supply pipe, preferably two to five raw-material supply pipes, more preferably three raw-material supply pipes. Raw materials required for polymerization, namely, a monomer, an initiator and, as needed, reaction additives, may be supplied into the reactor via the raw-material supply pipe. The condenser sends back raw materials such as a monomer, etc. volatilized to a gas phase into a rector by liquefying the same, or collects a liquefied raw material.

The reactor includes an inner space, the inner space functions as a reaction space. The monomer, the initiator, etc. are input to the inner space, performing polymerization reaction.

The reactor further includes an agitator. The agitator is not specifically limited so long as reaction products in the reaction space may be stirred. As an embodiment, a screw agitator may be used.

For reference, the screw agitator is fixed to a rotation axis and stirs reaction products in the reaction space by simultaneously rotating according to the rotation axis. The rotation axis is extended to the outside of the reactor, and a motor is connected to an outside terminal (namely, a terminal located at the outside of the reactor with respect to the reactor) of the reactor. The outside terminal simultaneously rotates according to rotation of the motor. As needed, a governor and/or a transmission may be connected between the motor and the rotation axis.

To a terminal of an inner side (namely, a terminal locating within the reactor with respect to the reactor) of the rotation axis to which the screw agitator is connected, a scraper may be additionally connected. The scraper is installed such that the scraper contacts with a bottom of the reactor or is adjacent to a bottom of the reactor, scraping materials deposited or accumulated on the bottom of the reactor.

The reactor may further include an exhaust pipe. The exhaust pipe is fluidly connected to the reactor, emitting gas-phase materials to be emitted from the reactor. The exhaust pipe emits air when an interior of the reactor is purged with air or nitrogen, controls inner pressure of the reactor when reaction products such as a monomer, initiator, etc are supplied inside the reactor, or emits gas-phase materials during or after reaction.

The exhaust pipe may further include a pressure regulator. In the present invention, a portion of a gas-phase monomer vaporized in the reactor is emitted from the reactor by properly opening the pressure regulator installed in the exhaust pipe, thereby controlling the amount of an additionally added monomer into the reactor. The pressure regulator is constituted such that flow of gas-phase materials is controlled by controlling the exhaust pipe. Accordingly, flow of gas that passes through an interior of the exhaust pipe is blocked to increase interior pressure of the reactor, or interior pressure of the reactor is lowered by allowing continuous gas flow.

To the exhaust pipe, a flowmeter or a pressure gauge may be additionally connected. A mass flow controller (MFC) may be connected to the exhaust pipe.

The coating-agent supply pipe may be connected to an upper portion of the reactor. Due to such a composition, a coating agent is supplied a lower portion of the reactor on which PVC having a relatively higher gravity than the vinyl chloride monomer may be deposited, whereby overheating of PVC, which is mainly present in the reactor lower portion, clash between resin particles, etc. may be more effectively reduced. The bulk PVC particle coating agent may be supplied batchwise between pre-polymerization and post-polymerization.

In addition, the bulk polymerization of the present invention may be carried out, for example, under a pressure of 8 to 10 K/G. Accordingly, input of the coating agent may be carried out before inputting the pre-polymerized seed polymer and vinyl chloride monomer into the post-polymerization reactor.

On the outside of the reactor, a temperature control jacket such as a water jacket, etc. may be additionally provided. The temperature control jacket circulates a heating medium, mainly heated or cooled water, or oil, therein, and thus, according to temperature of the heated or cooled heating medium, temperature of the reactor, particularly inner temperature of the reactor may be controlled.

A discharge pipe is fluidly connected to the lower portion of the reactor. Reaction products, namely, polymerized resin products, other non-reacted products, an initiator, etc. are emitted from the reactor via the discharge pipe such that the reaction products may be collected.

The apparatus for PVC bulk polymerization may further include a reactor for pre-polymerization. The pre-polymerization reactor such that inflow of a seed polymer generated from the pre-polymerization reactor is performed. The pre-polymerization reactor may further include a raw-material supply pipe fluidly connecting between the reactor and the pre-polymerization reactor, and a raw-material supply pipe for supplying the monomer and a post-polymerization initiator into the reactor.

Now, the present invention will be described in more detail with reference to the following examples. These examples are provided only for illustration of the present invention and should not be construed as limiting the scope and spirit of the present invention.

Example 1

Into a reactor of a 200 l pre-polymerization apparatus, 135 kg of vinyl chloride monomer was input, and, as an initiator, 0.05 parts by weight of di-2-ethyl hexyl peroxydicarbonate (OPP) with respect to 100 parts by weight of a vinyl chloride monomer was input. Subsequently, pressure was elevated up to 10 K/G and polymerization was performed for 16 minutes, thereby preparing a seed polymer having a size of 110 μm.

Into a reactor (500 l) for post-polymerization according to the present invention equipped with a pipe for supplying a particle coating agent, 0.01 parts by weight of propanetriol with respect to 100 parts by weight of the vinyl chloride monomer was input. When a seed polymer prepared from pre-polymerization was input to a lower portion of a post-polymerization reactor, 60 parts by weight of the vinyl chloride monomer was transferred and input to the reactor according to the present invention.

When transferring of the vinyl chloride monomer was completed, 0.1 parts by weight of 1,1,3,3-tetramethylbutylperoxyneodicarbonate (OND) as an initiator was additionally input to the reactor, and polymerization was carried out for 40 minutes under a pressure of 7.1 K/G. Subsequently, additional polymerization was carried out for 140 minutes after elevating pressure to 8.0 K/G.

Subsequently, at a last polymerization stage, 0.01 parts by weight of butylated hydroxytoluene as a polymerization inhibitor were input to the reactor, and the reactor was heated at 66° C. for 20 minutes under vacuum while stirring, removing a remaining vinyl chloride monomer. Finally, PVC was obtained.

Properties of the obtained PVC were measured. Results are summarized in Table 1 below.

<Fine Particle Content>

Particle diameters of PVC particles were measured using a particle diameter analyzer (HELOS/BR apparatus manufactured by SYMPATEC). After measuring how fine particles having an average particle diameter of 38 μm or less to large particles having an average particle diameter of greater than 2000 μm distribute, a distribution ratio of fine particles having an average particle diameter of 70 μm or less was represented by a % unit.

<Reactor Heat Removal>

Heat removal of the reactor was calculated by measuring in-out temperature of cooling water supplied into the reactor using a sensor and by multiplying the measured in-out temperature by flux of the cooling water.

<Scale Content>

After jet-cleaning (cleaning an inner wall of the reactor by strongly shooting water) an inner wall of the reactor, the amount of PVC masses adhering to an inner wall was measured with the naked eye. For reference, since the amount of the PVC masses was significantly, differently observed with the naked eye, it was unnecessary to measure the weight thereof. When propanetriol was used, a few scales were generated as much as an inner wall of the reactor was shiny.

Example 2

The same process as in Example 1 was repeated except that 0.02 parts by weight of propanetriol as a particle coating agent with respect to 100 parts by weight of the vinyl chloride monomer were added.

Comparative Example 1

The same process as in Example 1 was repeated except that addition of propanetriol was omitted.

In Table 1 below, the amounts of fine particles, reactor heat removal effects, scale contents and evenness of generated PVC particles measured during bulk polymerization according to Examples 1 and 2, and Comparative Example 1 were summarized.

TABLE 1

| Classification | Example 1 | Example 2 | Comparative Example 1 |
|---|---|---|---|
| Fine particle content (distribution ratio %) | Very low (1%) | Very low (1%) | High (3%) |
| Fine particle distribution ratio of 20 μm or less | 0.5% | 0.5% | 1.5% |
| Reactor heat removal | In-out temperature differences of cooling water are large and flux is small | In-out temperature differences of cooling water are large and flux is small | In-out temperature differences of cooling water are small and flux is large |
| Scale content | Very low | Very low | Very large |

As shown in Table 1, it can be confirmed that fine particle contents and scale contents in Examples 1 and 2 are much lower than those in Comparative Example 1. In addition, it can be confirmed that reactor heat removal effects in Examples 1 and 2 are excellent.

In particular, it can be confirmed that fine particle distribution ratios in Examples 1 and 2, which are less than 2.5%, are improved with respect to Comparative Example 1 exceeding 2.5%.

Additionally, while distribution ratios of 20 μm fine particles are less than 1% in Examples 1 and 2, a 20 μm fine particle distribution ratio in Comparative Example 1 is greater than 1%. Accordingly, the fine particle distribution ratios are dramatically different.

For reference, in the Table, large in-out temperature difference of cooling water means that heat is satisfactorily transferred and heat may be removed with small flux. On the other hand, it means that, when in-out temperature difference of the cooling water is small, heat transfer is not satisfactory and thus, in-out temperature in order to remove the same heat.

What is claimed is:

1. A bulk PVC composition comprising a vinyl chloride monomer, an initiator and a bulk PVC particle coating agent,
    wherein the PVC particle coating agent is a hydrocarbon alcohol having two to four hydroxyl groups, and
    wherein the hydrocarbon alcohol having two to four hydroxyl groups is one or more selected from ethylene glycol, diethylene glycol, propylene glycol, hexamethylene glycol, propanetriol, trimethylolpropane and pentaerythritol.

2. The bulk PVC composition according to claim 1, wherein the PVC particle coating agent is propanetriol.

3. The bulk PVC composition according to claim 1, wherein the bulk PVC particle coating agent is a coating material input to an inner wall of a post-polymerization reactor and an agitator before transferring a seed polymer generated through pre-polymerization.

4. The bulk PVC composition according to claim 1, wherein an amount of the bulk PVC particle coating agent is 50 to 300 ppm with respect to 100 parts by weight of a vinyl chloride monomer.

5. The bulk PVC composition according to claim 1, wherein the vinyl chloride monomer is only a vinyl chloride monomer or a mixture of a monomer copolymerizable with the vinyl chloride monomer, wherein the monomer copolymerizable with the vinyl chloride monomer is one or more selected from vinyl esters, aromatic vinyl compounds, acylic acids, monoolefins and vinylidene halides.

6. The bulk PVC composition according to claim 1, wherein the initiator is one or more selected from 3-hydroxy-1,1-dimethylbutylperoxyneodecanoate, cumyl peroxyneodecanoate, 1,1,3,3-tetramethylbutyl peroxyneodecanoate, cumyl peroxyneoheptanoate, t-amylperoxy neodecanoate, t-butylperoxy neodecanoate and t-butylperoxy neoheptanoate.

7. The bulk PVC composition according to claim 1, wherein the initiator is comprised in an amount of 0.01 to 0.1 parts by weight with respect to 100 parts by weight of the vinyl chloride monomer.

8. A bulk PVC polymerization method, wherein the bulk PVC polymerization is performed such that a distribution ratio of fine particles having sizes of 70 μm or less is less than 2.5%.

9. The method according to claim 8, wherein the distribution ratio of fine particles having sizes of 70 μm or less is less than 2.0%, and a distribution ratio of fine particles having sizes of 20 μm or less is less than 1.0%.

10. The method according to claim 8, wherein, in the bulk polymerization, bulk-polymerizing a vinyl chloride monomer in a presence of a initiator through pre-polymerization; inputting a particle coating agent to a post-polymerization reactor before transferring a seed polymer generated through pre-polymerization; and polymerizing PVC in a post-polymerization reactor into which the particle coating agent is input are sequentially performed.

\* \* \* \* \*